United States Patent

[11] 3,542,083

[72] Inventor Thomas Hindle
    Brow; Blackburn, England
[21] Appl. No. 756,064
[22] Filed Aug. 28, 1968
[45] Patented Nov. 24, 1970
[73] Assignee Hindle, Son & Company Limited,
    Blackburn, England
[32] Priority Sept. 2, 1967
[33] Great Britain
[31] No. 40230/67

[54] DOBBY MECHANISM
    7 Claims, 8 Drawing Figs.
[52] U.S. Cl. ............................................... 139/76
[51] Int. Cl. ............................................... D03c 1/00
[50] Field of Search ................................ 139/76, 77, 66

[56] References Cited
    UNITED STATES PATENTS
1,371,564  3/1921  Leeming ..................... 139/76
3,115,899 12/1963 Hindle ......................... 139/76
    FOREIGN PATENTS
980,025   1/1965  Great Britain ............... 139/76

Primary Examiner—James Kee Chi
Attorney—Roberts, Cushman and Grover

ABSTRACT: A Leeming-type dobby or head motion having a plurality of axially shiftable segment gears, a crank gear corresponding to each such segment gear, and a shifter whereby the segment gears are adjusted axially into or out of engagement with their respective crank gears, also includes a dwell plate in respect of each segment gear, the dwell plate being rotatable with the segment gear and being engageable with a lock-tooth on the cooperating crank gear so as to prevent rotation thereof. The shifter is nonrotatable and engages between the segment gear and the dwell plate, or between such plate and a boss upon which the segment gear is mounted.

INVENTOR:
THOMAS HINDLE

INVENTOR:
THOMAS HINDLE

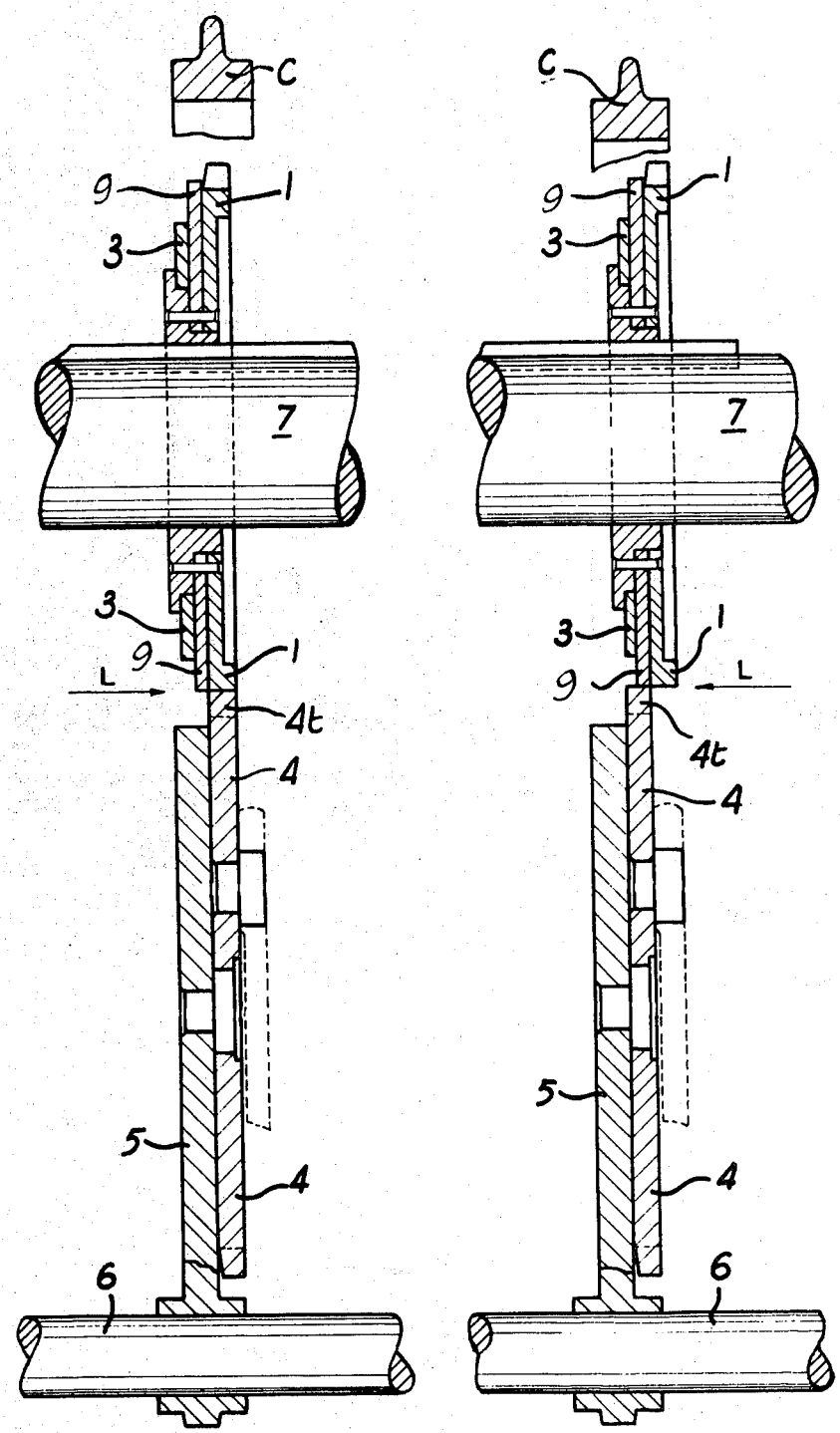

DOBBY MECHANISM

This invention relates to Leeming or Leeming-type dobbies, or head-motions, in which a plurality of continuously rotating segment-gears are adapted to slide along their splined driving shaft (or shafts) so as independently to engage or disengage a corresponding number of crank-gears, which by their consequent half rotations, actuate jack-levers, by which the dobby carries out its functions, e.g., the heald shafts are lifted and lowered through the medium of streamer connections, pulleys and tie-ups. The intermittent engagement of the segment-gears and crank-gears takes place under the control of a pattern-chain, or equivalent sensing device, in which the desired order of gear and jack-lever movements is recorded for serial sequence.

Each segment-gear is independently shifted along the splined shaft by a shifter which, while suitably restrained from rotating with the segment-gear, is given the necessary lateral movement by a cam-lever having cam-grooves adapted to engage two diametrically opposite pins fixed in the shifter, which pins may be fitted with antifriction rollers to work in the said cam-grooves.

The cam-levers swing on a common fulcrum-bar, and are adapted to be independently lifted, either by the pattern-chain or by a relay mechanism controlled by the pattern-chain in the manner described in our prior British Pat. No. 904,322, thereby shifting the segment-gears laterally into their engaging position, or, conversely, to be lowered, usually by gravity with some spring assistance, thereby shifting the segment-gears back into their nonengaging position.

Each segment-gear is provided in the usual manner with gear teeth on about one-half of its periphery while the remainder has an arcuate profile adapted to engage, with working clearance, the concave outer profile of one or the other of two large lock-teeth formed, diametrically opposite to each other, on the crank-gear.

At all times, except when the segment-gears and their coacting crank-gears are turning with their teeth in mesh, the crank-gears are locked in one or the other of their dead-centre positions, so as to prevent their unwanted rotation until further changes are initiated by the pattern-chain. As stated, this locking action is achieved by the concave outer end of either of the two lock-teeth on the crank-gear being engaged by a suitable arcuate profile throughout the angle of heald-shaft dwell. It is while the crank-gears are locked and held stationary in this manner that the rotating segment-gears are shifted along their shaft in readiness for the next change of shedding and, as will be shown, the relative ease with which the segment-gears can be so shifted laterally depends, to a major extent, upon whether the said arcuate profile which provides the locking action is rotary or nonrotary.

Theoretically, there is zero torque reaction on the crank-gear when its crankpin has completed its half-turn and it is locked and held stationary with the crank on dead-centre. In practice, however, with known construction the friction between the engaged locking surfaces, especially when weaving heavy cloth in wide looms, causes appreciable resistance to lateral movement. Moreover, such frictional resistance acting at the arcuate locking radius sets up a force-couple which tends to bind the comparatively narrow segment-gear unit on its splined shaft, thereby amplifying the lateral resistance and the possibility of derangement of the mechanism.

When a segment-gear is in full alignment with its coacting crank-gear and has turned into its angle of dwell, one of the latter's lock-teeth is engaged and locked by the arcuate dwell profile of the rotating segment-gear. In these circumstances, therefore, that profile is in rotary sliding contact with the concave profile of the lock-tooth throughout the angle of dwell, and consequently the frictional resistance to lateral movement of the segment-gear is negligible insofar as the locking surfaces are concerned.

When, however, the segment-gear is shifted laterally out of alignment with the crank-gear, the necessary locking action is provided, in known construction, by the arcuate profile of the nonrotating shifter, as is clearly shown in FIG. 2 of the accompanying drawings, further referred to below. In these circumstances, therefore, there is no compensatory rotary sliding movement between the engaged locking surfaces, and consequently their full frictional resistance to movement impedes the lateral movement of the segment-gear over the whole of such movement and in both directions.

The object of this invention is to provide an improved construction of combined segment-gear and shifter, whereby the frictional resistance between the engaged locking surfaces does not appreciably impede the normal lateral to and fro movements of the segment-gears along their splined shaft.

According to this invention, the nonrotating arcuate profile of the known form of shifter, hitherto used for locking purposes as above described, is replaced by a simple circular dwell-disc rotatable with the segment-gear, but is spaced sufficiently apart therefrom to accommodate the non-rotating shifter, thereby ensuring that the concave end of a lock-tooth on the crank-gear, whenever this is dwelling in a dead-centre position, is engaged and locked by the arcuate profile of the segment-gear and/or the equivalent circular profile of the said dwell-disc, both of which are constantly rotating when the dobby is being operated, the arrangement being such that the lock-tooth does not contact any part of the nonrotating shifter.

The invention is a practical application of the well-known physical phenomenon, viz—that when a cylindrical plunger, capable of both rotary and reciprocatory movement in a bored guide, is constantly rotated by other power means, the plunger offers little or no frictional resistance to longitudinal sliding movement.

The invention will now be described further, by way of example only with reference to the accompanying drawing illustrating one embodiment thereof and in which.

Figures 1, 2:
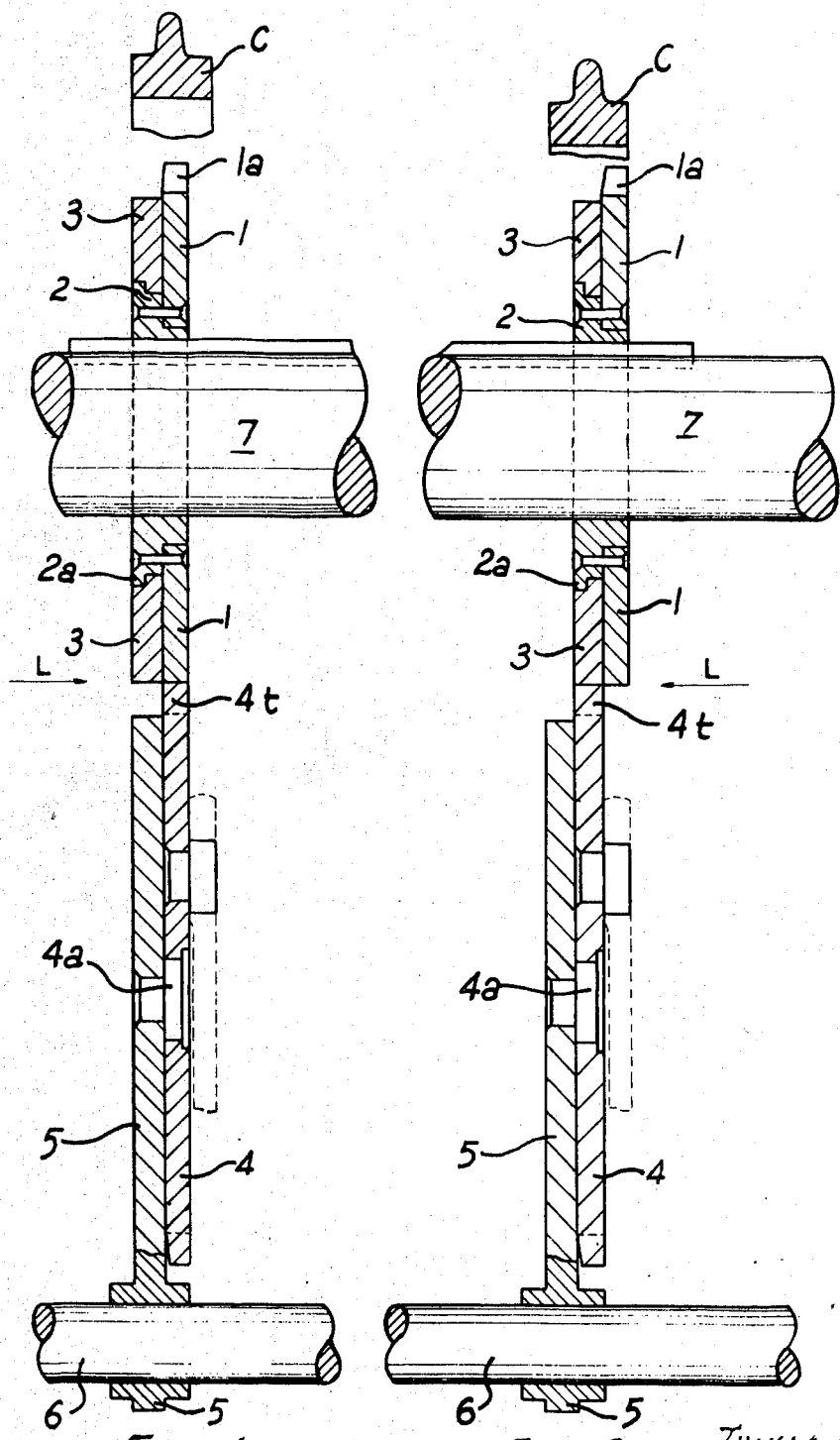
FIG. 1 is a section taken through a known form of segment-gear and shifter, with the segment-gear in a position of alignment with the crank-gear.
FIG. 2 is a similar view to FIG. 1 but with the segment-gear out of alinement with the crank-gear.
Figure 3:
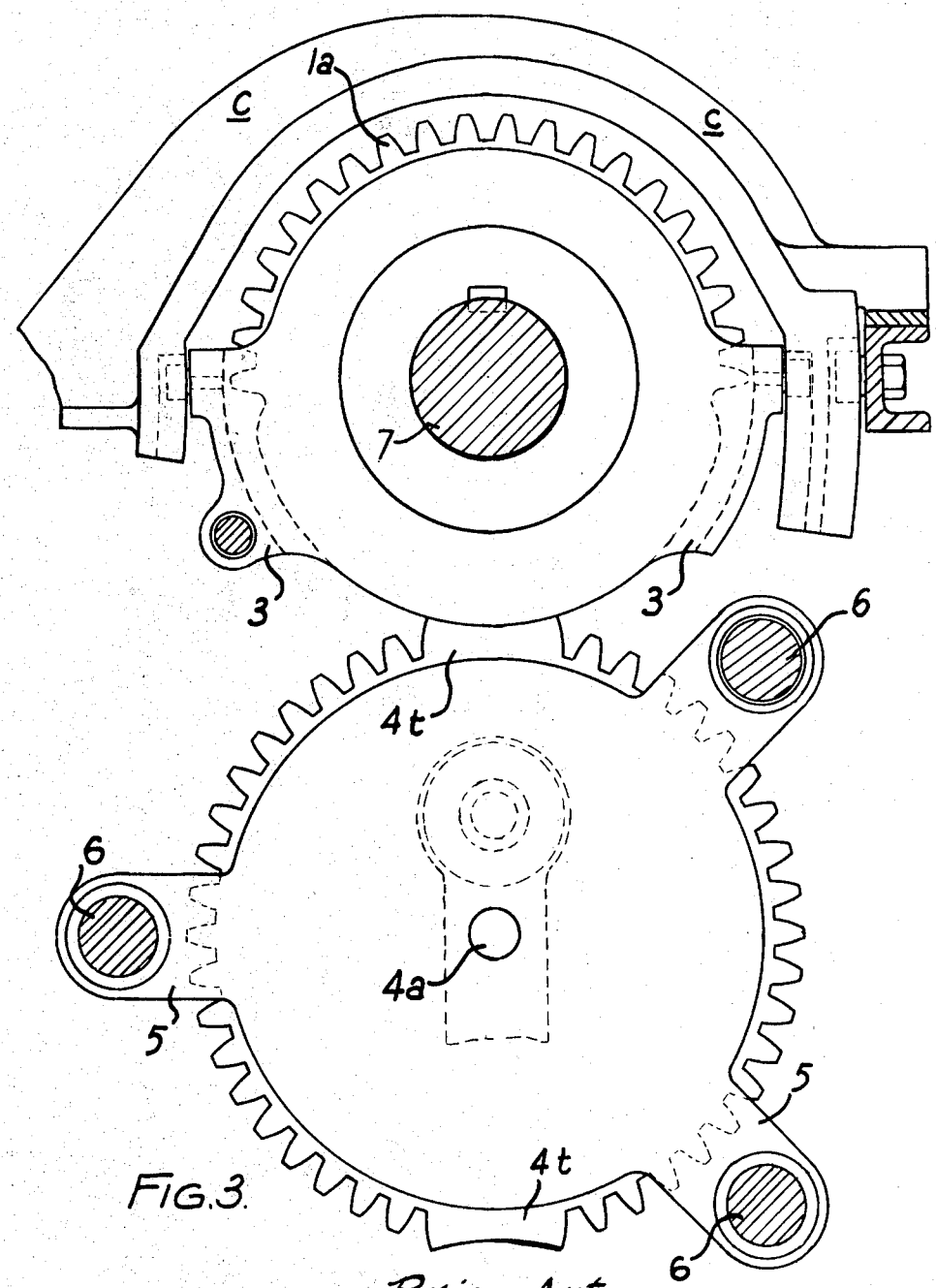
FIG. 3 is a front elevation of the arrangement shown in FIGS. 1 and 2.
Figures 4, 5:
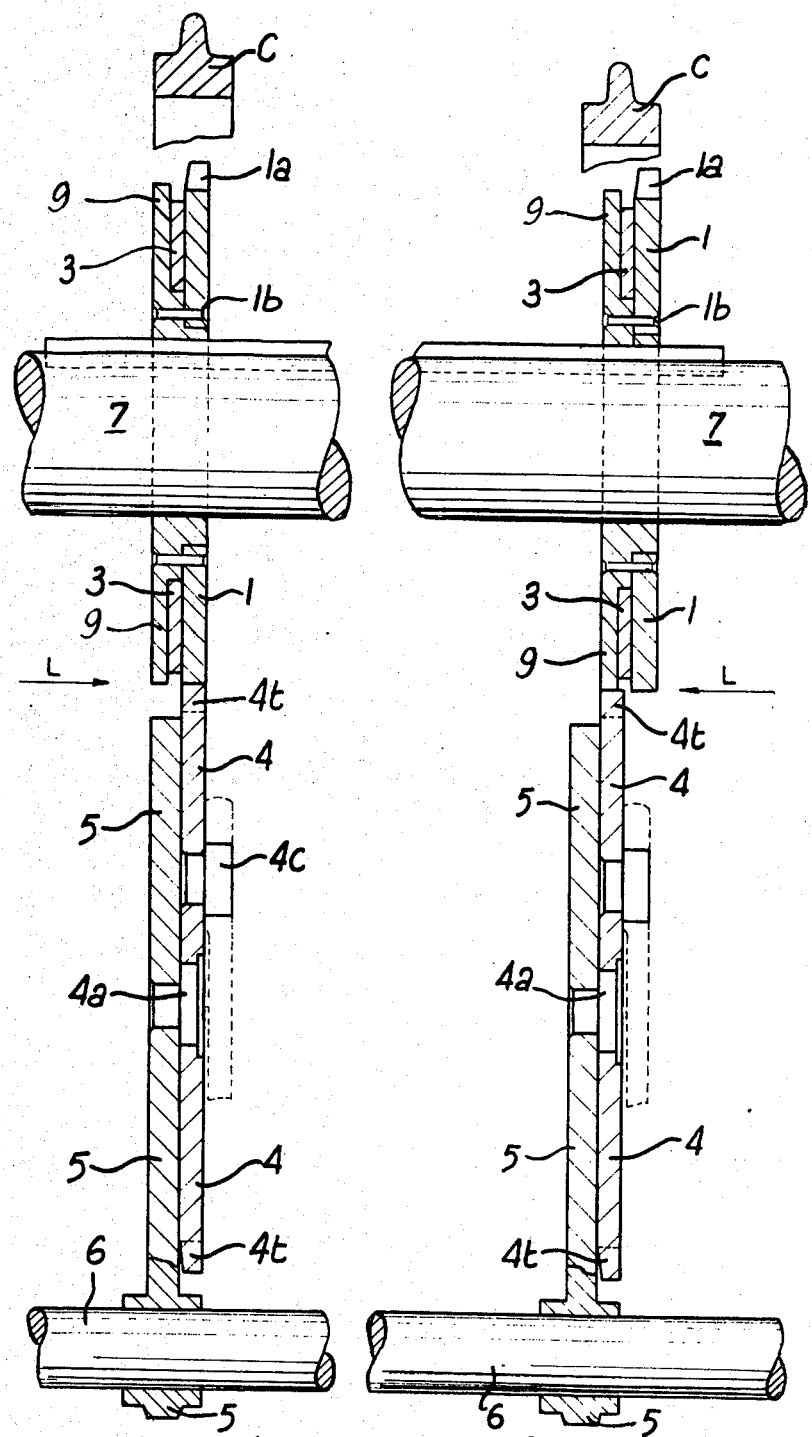
Figure 6:
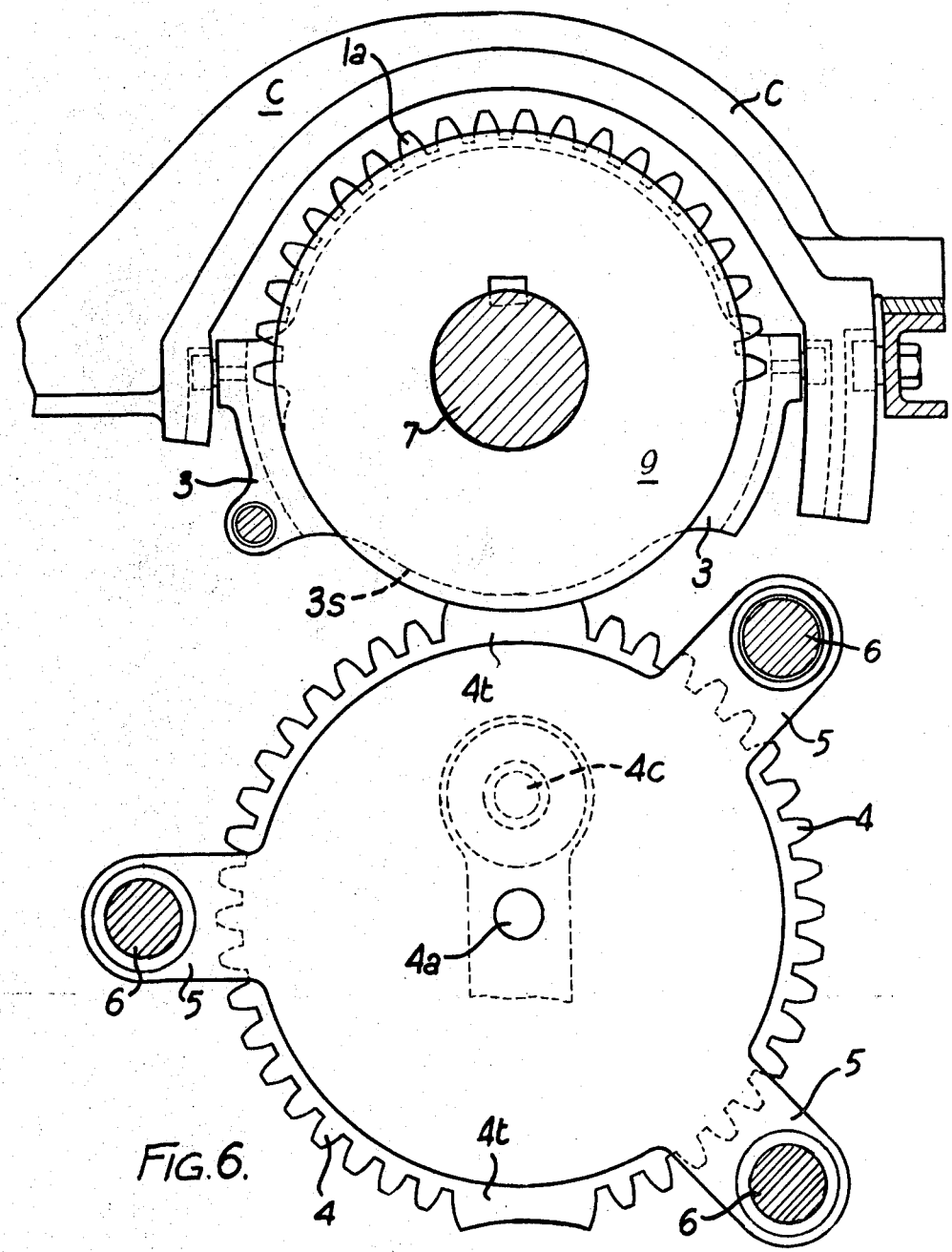

FIGS. 4, 5 and 6 are views corresponding respectively to FIGS. 1, 2 and 3 and show a first form segment-gear and shifter according to the invention; and FIGS. 7 and 8 are views corresponding respectively to FIGS. 4 and 5 of a second embodiment of the invention.

Referring now to the drawings, and particularly to FIGS. 1 to 3, thereof, a segment-gear 1 is attached by screws or rivets to a boss 2, which boss has a sliding fit on the splined driving shaft 7. The boss 2 is provided with a small lip 2a which retains the nonrotating shifter 3 in position thereon. The segment-gear has gear teeth 1a on about one-half of its periphery, while the remainder has an arcuate dwell profile, the radius of which dwell profile is approximately equal to the pitch circle radius of the gear teeth 1a.

The segment-gear coacts in the usual manner with the crank-gear 4, which is thereby intermittently rotated on the stub-axle pin 4a, fixed in spider 5, any number of which may be supported on two or more through-bars 6. The segment-gear 1 is moved laterally along shaft 7, to and fro between the position shown in FIG. 1 and that shown in FIG. 2, by the shifter 3, which is suitably restrained from rotating, and is actuated in a lateral direction by a cam-lever C.

In the position shown by FIG. 1, the rotating arcuate dwell profile of the segment-gear 1 is in engagement at L with one of the two lock-teeth 4t formed on the crank-gear 4 but lateral movement of the segment-gear and shifter to the right (i.e., towards the position shown in FIG. 2) at once brings the nonrotating shifter 3 into increasing contact with the lock-tooth 4t, until as shown by FIG. 2, the lock-tooth is wholly engaged at L by the arcuate profile of the nonrotating shifter 3.

With the known construction shown by FIGS. 1, 2 and 3, as above explained, the full frictional resistance to movement between the engaged locking surfaces at L impedes the lateral movement of the segment-gear from one position to the other, and is liable to cause the segment-gear to bind on the shaft.

Referring now to FIGS. 4, 5 and 6, which show one form of the improved construction, the principal difference from the known construction shown in FIGS. 1, 2 and 3, rests in the provision of the dwell-disc 9, with the shifter 3 loosely interleaved between the said dwell-disc and the segment gear 1, which dwell-disc and segment gear are fastened together by screws or rivets as indicated at 1b. The external radius of the dwell-disc is the same as that of the segment-gear's arcuate dwell profile, while the external radius 3s of the shifter 3 is such that it does not extend to the contact line L.

At appropriate times, the concave profile of the adjacent lock-tooth 4t on the coacting crank-gear 4 is engaged and locked by the segment-gear 1 and/or the dwell-disc 9, as these are laterally moved, in one unit, from one position to the other. During such locking engagement, the arcuate dwell profile of the segment-gear 1 and/or the equivalent circular profile of the dwell-disc 9 are in continuous sliding contact with the concave profile of the adjacent lock-tooth, therefore the frictional resistance of such engaged surfaces to additional movement in a lateral direction is negligible, and consequently the normal lateral to and fro movements of the segment-gears along their splined shaft are not appreciably impeded.

In a modification, shown by FIGS. 7 and 8, with the same practical effect, the positions of the dwell-disc and the shifter shown by FIGS. 4 and 5 are transposed.

I claim:

1. A Leeming-type dobby or head motion comprising a plurality of axially shiftable segment gears rotatable about a predetermined axis, each segment gear having a toothed portion and an arcuate portion, a crank gear associated to each segment gear, each crank gear having a toothed portion engageable with the toothed portion of the segment gear and lock teeth having arcuate end faces the radii of curvature of which corresponds substantially to the radius of the arcuate portion of the segment gear engageable with said arcuate portion of the segment gear and a shifter for each segment gear adapted to effect an axial displacement of the segment gear into or out of engagement with its associated crank gear, characterized in that a dwell plate is associated with each segment gear and for rotation therewith, the said dwell plate having a peripheral face of a constant radius adapted to be selectively engaged with a lock tooth on the associated crank gear to prevent rotation thereof.

2. A dobby or head motion as claimed in claim 1 wherein the nonrotatable shifter is located intermediate the segment gear and its related dwell plate and is so dimensioned and arranged as to preclude locking engagement thereof with the crank gear.

3. A dobby or head motion as claimed in claim 1 wherein the dwell plate comprises a circular disc arranged coaxially with the segment gear.

4. A dobby or head motion as claimed in claim 1, wherein the dwell plate and segment gear define a peripheral groove therebetween to receive the nonrotatable shifter.

5. A dobby or head motion as claimed in claim 1, wherein the shifter is disposed at that side of the dwell plate remote from the segment gear.

6. A Leeming-type dobby or head motion comprising a plurality of axially shiftable segment gears, each segment gear having an arcuate portion and a toothed portion, a crank gear associated with each segment gear, each crank gear having a toothed portion engageable with the toothed portions of segment gear and lock teeth for engagement with the arcuate portions of the segment gear, said lock teeth having arcuate end faces the radii of curvature of which correspond substantially to the radius of the arcuate portion of the segment gear, a dwell plate associated with each segment gear and mounted for rotation therewith; said dwell plate having a peripheral face of a constant radius adapted to be selectively engaged with the faces of the lock teeth on the cooperating crank gear to prevent rotation thereof, and a shifter for each segment gear adapted, to effect an axial displacement of the segment gear into or out of engagement with its associated crank gear, the said shifter extending directly between the dwell plate and associated segment gear and being so dimensioned and arranged as to preclude locking engagement thereof with the crank gear.

7. A Leeming-type dobby or head motion comprising a plurality of axially shiftable segment gears, each segment gear having a toothed portion and an arcuate portion, a crank gear associated with each segment gear, each crank gear having a toothed portion adapted to be engaged with the toothed portion of the segment gear and lock teeth having end faces the radii of curvature of which correspond to the radius of the arcuate portion of the segment gear, a dwell plate associated with each segment gear and mounted for rotation therewith, said dwell plate having a peripheral face of a constant radius adapted to be selectively engaged with a lock tooth on the associated crank gear to prevent rotation thereof, and a shifter for each segment gear adapted to effect an axial displacement of the segment gear into or out of engagement with its associated crank gear, the said shifter engaging a groove between a flanged boss upon which the segment gear is mounted and the dwell plate and at that side of the latter remote from the segment gear.